UNITED STATES PATENT OFFICE.

CHARLES A. STEWART, OF CARSON CITY, NEVADA.

ALUMINUM-SOLDERING COMPOUND.

1,222,158. Specification of Letters Patent. Patented Apr. 10, 1917.

No Drawing. Application filed May 13, 1916. Serial No. 97,414.

*To all whom it may concern:*

Be it known that I, CHARLES A. STEWART, a citizen of the United States, and resident of Carson City, in the county of Ormsby and State of Nevada, have invented certain new and useful Improvements in Aluminum-Soldering Compounds, of which the following is a specification.

The present invention relates to new and useful improvements in metallurgy and has particular reference to an improved soldering composition, the same being particularly designed for the purpose of uniting aluminum, this being at the present time one of the most difficult soldering processes to successfully be performed.

The principal object of my invention is to provide a soldering compound for aluminum, the compound being composed of a new alloy of proportionally associated metallic substances.

Other objects and advantages to be derived from the use of my improved soldering compound will appear from the following detail description and the claims, and while hereinafter I shall specifically set out certain proportions and compositions, it is to be understood that I do not limit myself specifically to the details mentioned.

Referring more specifically to the compound of my invention the same consists of a homogeneous mass of metal built up of tin, lead, zinc and silver all combined in the following proportions, which are preferable:

| | |
|---|---|
| Tin | 69.07 parts. |
| Lead | 28.77 parts. |
| Zinc | 1.44 parts. |
| Silver | .72 parts. |

Through actual experience in this art and considerable experiments I have discovered that the proportions above enumerated give the best results, but of course, I do not desire to be limited to this specific arrangement.

Concerning the combining of the elements to form a practicable and useful composition the same are deposited in a melting pot such as are commonly used in foundries and the like and reduced to a molten mass. This molten mass is thoroughly agitated until all of the constituent elements have become thoroughly mixed. The compound is now drawn off and formed in sticks or rods for commercial use.

From the above description it will be seen that I have provided a simple and cheap composition of metallic elements combined in a cheap and useful manner to form an effective soldering compound. Through actual test of this compound I have been enabled to connect two separate pieces of aluminum in such a manner as to make the joint stronger than the rest of the metal.

While I have described my invention as embodying a specific arrangement of the constituent elements I desire that it be understood that I reserve the right to make such changes in the same as do not depart from the spirit and scope of the invention as claimed.

Having thus fully described my invention, what I claim as new and desire to secure by Letters Patent, is:—

A soldering alloy of the class described, comprising tin 69.07 parts, lead 28.77 parts, zinc 1.44 parts, and silver .72 parts.

In testimony whereof, I affix my signature hereto.

CHARLES A. STEWART.